United States Patent [19]

Traver

[11] 4,043,924
[45] Aug. 23, 1977

[54] WATER BASED GREEN TIRE LUBRICANT

[75] Inventor: Frank J. Traver, Troy, N.Y.

[73] Assignee: General Electric Company, Waterford, N.Y.

[21] Appl. No.: 534,101

[22] Filed: Dec. 19, 1974

Related U.S. Application Data

[63] Continuation-in-part of Ser. No. 367,961, June 7, 1973, abandoned.

[51] Int. Cl.² .................. C10M 3/18; C10M 5/14; C10M 7/20; C10M 7/24
[52] U.S. Cl. ........................... 252/21; 252/28; 252/49.5
[58] Field of Search ............... 252/21, 28, 49.5

[56] References Cited

U.S. PATENT DOCUMENTS

| | | | |
|---|---|---|---|
| 2,733,272 | 1/1956 | Horsley et al. | 252/52 R |
| 3,554,910 | 1/1971 | Johnson | 252/49.5 |
| 3,713,851 | 1/1973 | Cekada | 252/28 |
| 3,759,827 | 9/1973 | Groenhof et al. | 252/49.6 |
| 3,835,052 | 9/1974 | McDole et al. | 252/49.5 |
| 3,915,869 | 10/1975 | Katono et al. | 252/49.5 |

*Primary Examiner*—Delbert E. Gantz
*Assistant Examiner*—Irving Vaughn
*Attorney, Agent, or Firm*—E. Philip Koltos; Edward A. Hedman; Rocco S. Barrese

[57] ABSTRACT

A preformulated inside green tire lubricant and bag release composition comprising a silicone fluid; an alkylene oxide polyol; a particulate solid for providing air bleed channels between the expanding pressure core and the green tire; water; and sufficient suspending and emulsifying agents to provide a stabilized, non-settling suspension. An example of the lubricant is as follows:

Lubricant a. water base
b. silicone fluid
c. glycerol adduct of propylene oxide
d. mica
e. magnesium silicate
f. amine salt of alkylarylsulfonic acid.

1 Claim, No Drawings

WATER BASED GREEN TIRE LUBRICANT

RELATED APPLICATION

This application is a continuation-in-part of copending U.S. application Ser. No. 367,961, filed June 7, 1973 now abandoned.

This invention relates to a composition for lubricating an expandable core during the molding of tires. More particularly, it concerns a water based silicone-containing emulsion composition which includes a particulate solid material for providing channels to bleed air trapped between the expanding core and the green tire during vulcanization.

BACKGROUND OF THE INVENTION

C. V. Toddy, U.S. Pat. No. 2,937,406 describes generally the fluid pressure core technology used by the industry in curing new tires and retreading old tires. In this technique, fluid pressure cores, such as full circle or sectional air bags, bladders, and the like, are inserted within uncured or green tires and like articles during vulcanization to force the external surface of the article into engagement with the mold and to exert pressure thereon. The Toddy patent discloses that it is critical to lubricate the interface between the external surface of the bag and the internal surface of the tire, especially beneath the shoulder areas of the bag because of the high frictional forces developed. Unless relieved, these forces lead to substantial reduction of tire gauge at this key area and eventually cause premature failure of the bag. Toddy proposed to overcome the friction by molding integral lubricated rubber layers into the air bag, but this is difficult and expensive to accomplish. Another approach to a green tire lubricating and bag release agent is that disclosed in Cekada, U.S. Pat. No. 3,532,624 in which a composition comprising a silicone fluid, a polyol, particulate mica, and 25 to 55% by weight of a hydrocarbon solvent is sprayed on the surface of a conventional bag, i.e., one which does not include lubricated strips, just before expansion into the green tire. All hydrocarbon solvents are flammable, many are toxic and most cause deterioration in the quality of the air, soil and water and thus are difficult to dispose of. Illustrative of the volatile, flammable, toxic state-of-the-art solvents described in Cekada are those boiling below 200° C., such as cyclohexane, toluene, gasoline, petroleum naphtha, and the like.

Thus, the tire industry has a demonstrated need for an easy to apply, efficient and non-polluting inside green tire lubricant and release agent. An ideal release agent should prolong bladder life, release effectively, both initially and after long term aging and cut down on defects, due to air bleed problems, and the like.

There has now been discovered a family of compositions, based on silicone emulsions, which provide the above-enumerated advantages. These compositions possess all of the important properties necessary for a preformulated green tire release agent and, because they are water based, there are no fire or health hazards or environmental problems in connection with their use.

DESCRIPTION OF THE INVENTION

According to the present invention, in its broadest aspects, there are provided compositions for reducing the friction between an expanding fluid pressure core and the internal surface of a green tire during vulcanization, said composition comprising:

a. a high molecular weight poly(diorganosiloxane) fluid;
b. a high molecular weight alkylene oxide polyol;
c. a particulate solid for providing air bleed channels between the expanding pressure core and the green tire;
d. water;
e. a thickening agent; and
f. an emulsifying agent, components (e) and (f) each being present in an amount sufficient to provide a stabilized, non-settling suspension of components (a), (b) and (c) in the water.

The compositions are preferably thick and viscous, having a viscosity within the range of 10,000 and 50,000 cps. at 25° C., although higher and lower viscosities can also be used.

The poly(diorganosiloxane) fluids or oils of the present compositions are well known to those skilled in the art. In general, they are high molecular weight linear polymers, alone or in the form of concentrated oil-in-water emulsions. More specifically, they will be members of a family represented by the formula

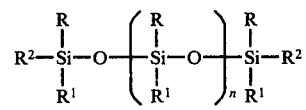

wherein R and R$^1$ are monovalent hydrocarbon radicals, such as aliphatic, haloaliphatic and cycloaliphatic radicals, e.g., alkyl, alkenyl, cycloalkyl, haloalkyl, including methyl, ethyl, propyl, chlorobutyl, cyclohexyl, trifluoropropyl, aryl radicals and halogenated aryl radicals, such as phenyl, chlorophenyl, xylyl, tolyl, and the like; aralkyl radicals, such as phenylethyl, benzyl, and the like, cyanoalkyl, such as cyanoethyl; and R and R$^1$ can be the same or different, but preferably are methyl or methyl and ethyl or methyl and phenyl, $n$ is a number within a range capable of conferring fluid or oil like properties on the polymer at 25° C., preferably a viscosity in the range of 25 and 100,000 cps. at 25° C., and wherein R$^2$ can include the same values as R and R$^1$ as well as hydroxyl, alkoxy, aryloxy, and the like.

Illustrative poly(diorganosiloxane) fluids will include poly(dimethylsiloxanes), copolymers of dimethylsiloxane and diphenylsiloxane, terpolymers of dimethylsiloxane, terpolymers of dimethylsiloxane, phenylmethylsiloxane and ethylmethylsiloxane, terpolymers of dimethylsiloxane, methylphenylsiloxane and methyltrifluoropropylsiloxane, copolymers of dimethylsiloxane and ethylmethylsiloxane, poly(ethylmethylsiloxane), copolymers of dimethylsiloxane and methylorganoethylsiloxane. The homo- and copolymers can be blocked at the ends, e.g., with triorganosiloxy units, such as trimethylsiloxane, dimethylbenzylsiloxane, dimethylphenylsiloxane units, and the like. Also included are copolymers including diorganosiloxane, e.g., dimethylsiloxane, and polyether units. Preferably, the organo substituents will be selected from methyl and phenyl groups. However, vinyl, trifluoropropyl, ethyl, propyl, octadecyl, allyl, cyclohexenyl, naphthyl chloromethyl, bromophenyl, and the like can be present as substituents.

The fluids are prepared by methods which are well known and widely used. For example, the appropriate diorganodihalosilane (or mixture thereof) is hydrolyzed to make a mixture of linear and cyclic prepolymers. These, or mixtures of the individual linear and cyclic prepolymers are then equilibrated with compounds, such as disiloxanes, to provide the triorganosiloxy terminating groups. The lower the concentration of equilibration compounds, the higher the molecular weight. The fluid is washed with water, neutralized, dried and devolatilized. Detailed directions are set forth in the Encyclopedia of Polymer Science and Technology, John Wiley & Sons, New York, Vol. 12, page 522 et seq. (1970). They are also widely available commercially from a number of sources.

The amount of silicone fluid to be used in the composition can vary but generally it will range from 2 to 20% by weight. If the silicone is added in the form of an emulsion, this amount will be based on the silicone solids in the emulsion. Preferably, the silicone fluid will comprise from about 5 to about 15% and especially preferably about 10% by weight.

The alkylene oxide polyol can be either a homopolymer of ethylene or propylene glycols or a copolymer of the two. Also intended to be included among these alkylene oxide polyols are poly(oxypropylene) triols such as, for example, glycerol adducts of propylene oxide or trimethylolpropylene adducts for propylene oxide. The molecular weight should be high, e.g., at least above 1,000. The polyethylene glycols will be of the general formula $$HOCH_2(CH_2OCH_2)_n CH_2OH$$

or

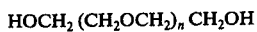

wherein $n$ and $x$ are numbers sufficiently high to give a molecular weight of at least 1,000. The polypropylene glycols will be of the general formula

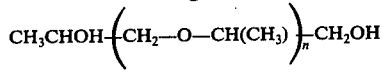

and

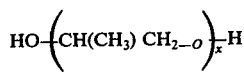

wherein $n$ and $x$ are as above defined. Using glycerol as the initiating polyol, the poly(oxypropylene) triols will be of the general formula

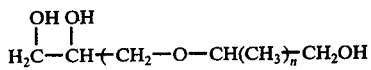

wherein $n$ is as above defined. These are made by the alkaline catalyzed reaction of ethylene glycol with varying amounts of ethylene oxide, and with propylene glycol and propylene oxide, and with glycerol (or other appropriate triols), and varying amounts of propylene oxide in well-known procedures. Preferably, the alkylene oxide polyol will be an ethylene oxide polyol, a propylene oxide polyol, a glycerol adduct of propylene oxide or a copolyol of ethylene oxide and propylene oxide. These are available from a number of commercial sources such as Olin Corp., WS-661; Olin Corp. Poly G-3030; Union Carbide, HV-660; Jefferson Chemical, WL-850A; Wyandotte Chemical Corp., Gp-3030; etc. Most preferably, the alkylene oxide polyol is a glycerol adduct of propylene oxide.

The amount of polyol in the composition can vary but there should be at least enough present to coact with the silicone to provide lubricity. Generally, an amount of between 2 and 20% will be used, the higher amounts with lower amounts of silicone and vice versa. Preferably, the amount of polyol will be between 7.5 and 15% and especially preferably about 10%.

The particulate solid functions to provide channels between the bag and the tire to permit air bleed. Any conventional material employed for this purpose can be used. Especially useful are mica and talc. The particle size can vary broadly, but preferably will be within the range of 160 to 600 mesh. Especially preferably, the particle size will be about 325 microns.

The amount of particulate solid can vary, but is generally in the range of 20 to 55% by weight. The smaller amounts are used with lower contents of silicone and polyol, i.e., more dilute compositions.

The nature of the thickening agent can vary broadly. For example, mineral colloids and bentonite clays can be used, as well as organic thickeners, such as carboxylated vinyl polymers, e.g., the Carbopol products of B. F. Goodrich Co. These function to prevent the particulate matter from settling out. Enough will be added, therefore, to serve this purpose. However, the amount will generally range from 0.05 to 5%, with higher amounts being used if the thickening agent is a mineral and the lower amounts if it is an organic polymer especially made for this purpose.

The nature of the emulsifying agent can vary broadly. It may be anionic, cationic, and non-ionic. The emulsifying agents can be salts of fatty acids, e.g., ammonium oleate, acetates of fatty amines, monoesters of polyethylene glycols and fatty acids, alkylated aryl polyether alcohols, such as acetylphenoxypolyethylene alcohols, and the like. Preferably, the emulsifying agent is a sorbitan ester, such as sorbitan sesquioleate, or an alkylarylsulfonate, such as sodium dodecylbenzenesulfonate, an amine salt of an alkylarylsulfonic acid, ammonium dodecylbenzenesulfonate or other amine salt of dodecylbenzenesulfonic acid and the like.

The amount of emulsifier will be selected to provide a stable, one-phase mixture of water and the resins. Generally, this will range from 0.05 to 5% by weight. Part of the emulsifying agent can be present in the silicone, if this is added to the composition as an oil-in-water emulsion, with the rest being separately added.

The manner of mixing the present compositions is conventional. One convenient way is to provide a stirred vessel of suitable size, then to add the silicone fluid, part of the water, part of the emulsifying agent to form an emulsion, then to add the thickener. Next, with slow agitation, there are added the particulate material, e.g., mica or talc, and then the alkylene oxide polymer, the rest of the emulsifier and, if desired, a small amount of a lubricity agent, such as oleic acid. Once blended to a uniform consistency agitation is increased and maintained until a stable suspension is obtained. As has been mentioned, the silicone fluid can be charged as an emulsion.

Application of the compositions in the tire molding process can be carried out by conventional methods. By way of illustration, they can be sprayed onto the side of the green tire with a 360° spray nozzle prior to curing. The tires are cured according to standard industry procedures. The description in U.S. Pat. No. 2,937,406, is illustrative and is incorporated herein by reference to save unnecessarily detailed explanation.

DESCRIPTION OF THE PREFERRED EMBODIMENTS

The following examples of specific formulations have proven to be particularly effective in producing the desired functional characteristics. They are illustrative only and are not to be construed to limit the invention in any manner whatsoever.

EXAMPLE 1

Into a one liter stainless steel beaker fitted with a mechanical stirrer are added 114g. of an oil-in-water emulsion of a 60,000 cps. viscosity poly(dimethylsiloxane) fluid at 34% silicone content (General Electric Company, SM-2061). With very slow agitation, 22g. of 0.5% thickener (B. F. Goodrich, Carbopol 934) is added. The thickener has previously been dissolved in water and neutralized to yield a thick water-based gel. Once the thickener gel has dissolved in the emulsion, the following are added using agitation speed: 142g. of 325 mesh mica to provide air-bleed in the mold, 40g. of ethylene oxide-propylene oxide polyol copolymer (Olin Chemical Co., WS-661; or Union Carbide, HB-660), 68g. of water, 12g. of sorbitan sesquioleate emulsifying agent and 2g. of oleic acid (which helps lubricity in the mold). Once blended to uniform consistency, agitation speed is increased and maintained for one half hour to produce the final composition. The final viscosity is 20,700 cps., measured on a Brookfield LVT viscometer with a No. 3 spindle at 3 rpm for 2 minutes. Centrifuge stability is measured in a 40 ml. calibrated tube running at 1,000 rpm for 15 minutes. Only 1 ml. of liquid is observed as a top layer.

A sample of inner liner tire stock is coated with a thin film of the composition and dried. It is allowed to age for 10 to 15 minutes. After 17 days at 70°-80° F., the sample is tested for release characteristics. The coefficient of friction of cured rubber sliding across to coated is only 0.197 compared to 0.9 on an uncoated sample.

EXAMPLE 2

In a 5 gallon, polyethylene lined vessel fitted with a variable speed mechanical stirrer are charged 2.8 lbs. of ethylene oxide-propylene oxide polyol copolymer, 0.2 lbs. of oleic acid, 2.9 lbs. of sorbitan sesquioleate, 8 lbs. of high viscosity poly(dimethylsiloxane) fluid emulsion (60,000 cps. dimethyl oil at 34% silicone) and 0.4 lbs. of thickener (R. T. Vanderbilt Co., Veegum HV), and enough water to provide 40% by weight of the final composition. This is done under slow agitation until the thickener is fully dispersed then 16.6 lbs. of 160 mesh mica is folded in. The mixture is stirred at high speed for 2 hours to produce the final composition. Viscosity is 36,000 cps. at 25° C. with a Brookfield LTV viscometer, No. 3 spindle, 3 rpm for 2 minutes.

The composition is sprayed through an atomized spray gun unit with a 360° spray nozzle and deposited inside a green passenger tire prior to curing in an air bag mold. The tire is cured according to standard industry procedures The lubricant releases well and cuts down on air bleed defects much better than conventional lubricants.

EXAMPLE 3

Into a two liter stainles steel beaker fitted with a mechanical stirrer are added 394 g. water and 10 g. mineral colloid m.o. With very rapid agitation the thickener is blended until a water based gel is formed. Once the thickner gel has dispersed in the water, the following are added using moderate agitation speed: 40 grams of polyethyleneoxide polypropyleneoxide methyl siloxane copolymer (PFA-1200 GE), 110 g. of ethyleneoxide propyleneoxide polyol copolymer, 440 g. talc (901A - Georgia Talc) to provide air bleed in the mold, and 0.5 g. $NaNO_2$ (corrosion inhibitor). Once blended to uniform consistency, agitation at rapid speed is maintained for an additional half hour to insure a uniform composition. The final viscosity is 29,000 cps, measured on a Brookfield RVF viscometer with a No. 4 spindle at 4 RPM for one minute. Centrifuge stability is measured in a 40 ml. calibrated tube running at 1000 RPM for 15 minutes. Less than 5 ml. of liquid is observed as a top layer.

A sample of inner liner tire stock is coated with a thin film of the composition and is allowed to air dry. After one day aging at 70°-80° F., the sample is tested for release characteristics. The coefficient of friction of a cured rubber sliding across the coated surface is only 0.330 (dynamic friction).

EXAMPLE 4

Into a two liter stainless steel beaker fitted with a mechanical stirrer are added 329 gm. of water and 10 gm. mineral colloid m.w. With very rapid agitation the thickner is blended until a water-based gel is formed. Once the thickner gel has dispersed in the water, the following are adding using moderate agitation speed: 110 gm. of an oil-in-water emulsion of a 60,000 cps. viscosity poly(dimethylsiloxane) fluid at 35% silicone content, 112 gm. of 325 mesh mica and 330 gm. talc (901A - Georgia Talc) to provide air bleed in the mold, 110 gm. of ethylene oxide-propylene oxide polyol copolymer, and 1 gm. $NaNO_2$ for corrosion inhibition. Once blended to uniform consistency, agitation speed is maintained for an additional half hour to insure a uniform composition. The final viscosity is 17,900 cps, measured on a Brookfield L.V.T. viscometer with a No. 3 spindle at 3 RPM for 2 minutes. Centrifuge stability is measured in a 40 ml. calibrated tube running at 1000 RPM for 15 minutes. Less than 5 ml. of liquid is observed as a top layer.

A sample of inner liner tire stock is coated with a thin film of the composition and is allowed to air dry. After 2 days aging at 70°-80° F, the sample is tested for release characteristics. The coefficient of friction of cured rubber sliding across the coated surface is only 0.349 (dynamic friction).

EXAMPLE 5

Into a one liter stainless steel beaker fitted with a mechanical stirrer are added 174 g. of water and 31 g. of thickener (8.5% Veegum, H.V. from R. T. Vanderbilt Co.) and the thickener is dispsersed under high speed agitation. Once the thickener is uniformly dispersed, the following are added using low speed agitation: 205 g. of 160 mesh mica, 72 g. of SM-2061 (identified in Example 1), 15 g. of G-3300 (an amine salt of an alkylarylsulfonate available from the Atlas Chemical Co.), 51 g. of GP-3030 ( a glycerol adduct of propylene oxide, sold by Wyandotte Chemical Corp.), 2 g. of formalin (acts as a bactericide) and 3 g. of oleic acid. The mixture is then agitated under high speed for one-half hour to insure a uniform blend of the final product. Viscosity is 22,450 cps. at 25° C with a Brookfield LTV viscometer, No. 3 spindle, 3 rpm. for 2 minutes.

A sample of inner liner tire stock is coated with a thin film of the composition and dried. After approximately 5-6 days' aging at 80° C the sample is tested for release characteristics. The coefficient of cured rubber sliding across the surface is only 0.289, while the coefficient of stick friction is only 0.355.

Obviously, other variations in the compositions are possible in light of the above teachings. For instance, the silicone can contain diphenylsiloxane units, as well as polyether units in addition to the dimethylsiloxane units. Instead of the polyol copolymer, a polyethyleneoxide polyol can be used. Instead of Carbopol, bentonite gelled with methanol can be used as a thickner. Instead of sorbitan sesquioleate, sodium dodecylbenzene sulfonate can be used as an emulsifying agent.

The data demonstrate that the present invention provides a preformulated inside green tire lubricant based on emulsified silicones which are non-polluting water based systems. Moreover, there is provided a family of inside tire lubricants which can be tailored to individual release and/or air bleed requirements. Finally, the compositions are shown to be effective and easy to use.

The invention has been broadly described and variations may be made without departing from the spirit and scope thereof.

I claim:
1. A composition for reducing the friction between an expanding fluid pressure core and the internal surface of a green tire during vulcanization, said composition comprising:
   a. from 2 to 20% by weight of a high molecular weight poly(diorganosiloxane) fluid;
   b. from 2 to 20% by weight of a glycerol adduct of propylene oxide;
   c. from 20 to 55% by weight of mica;
   d. from 0.05 to 5% by weight of a magnesium silicate;
   e. from 0.05 to 5% by weight of an amine salt of an alkylaryl sulfonic acid; and
   f. the substantial balance being water.

* * * * *